March 1, 1966  G. A. WALLACE  3,237,523
LOW LIQUID LEVEL CONTROL VALVE
Filed Oct. 14, 1963  2 Sheets-Sheet 2

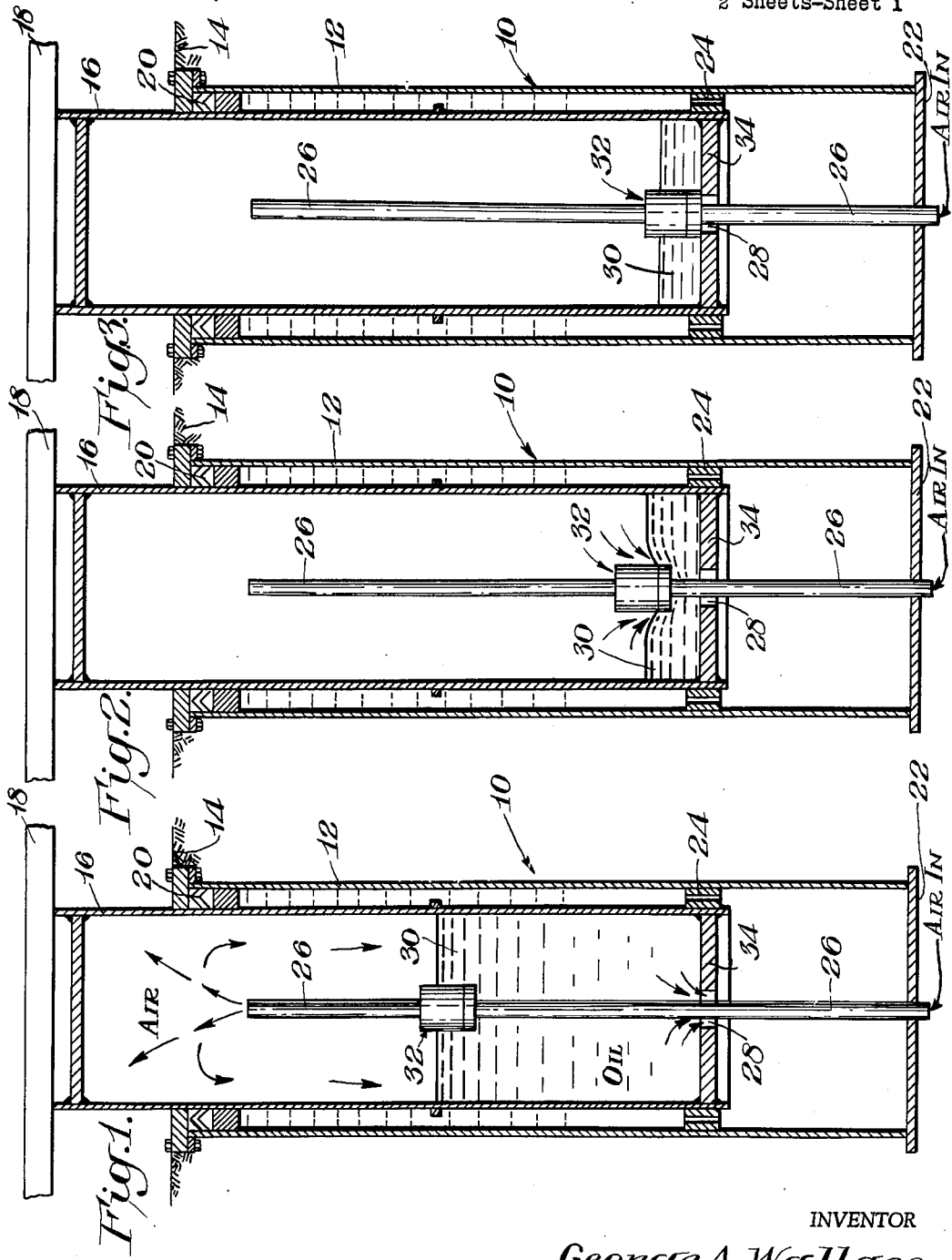

INVENTOR
George A. Wallace
BY Connolly and Hutz
ATTORNEYS

United States Patent Office 3,237,523
Patented Mar. 1, 1966

3,237,523
LOW LIQUID LEVEL CONTROL VALVE
George A. Wallace, Philadelphia, Pa., assignor to Globe Hoist Company, a corporation of Maryland
Filed Oct. 14, 1963, Ser. No. 315,971
10 Claims. (Cl. 91—4)

This invention relates to a low level control valve for a semi-hydraulic lift and more particularly to such a valve for use within the plunger of such a lift.

In a semi-hydraulic lift air is pumped into the plunger mounted within the oil filled cylinder to force the oil down into the cylinder and lift the plunger as the liquid level in the cylinder rises. When the supply of oil is too low and all liquid is drained from the plunger as it is being lifted, the plunger is raised by air pressure that causes it to move too rapidly, irregularly, and dangerously. Various float-operated, low-level control devices have been used in the bases of such plungers for preventing all of the oil from being forced out of them and thereby arresting the lifting of the plunger when the oil level is too low. Some of these devices are installed about an air line extending through an opening in the base of the plunger.

An object of this invention is to provide a simple, economical, and efficient float-operated, low-level control valve for installation about an air line inserted through the base of a plunger of a semi-hydraulic lift.

In accordance with this invention such a valve is a ring-like buoyant member having a resilient base large enough in radial dimension to act as a sealing element between the air line and the periphery of the plunger base opening. The inner surface of the sealing element is slightly spaced from the air line to facilitate its free floating about the air line when the sealing element is unstressed. When the oil reaches a predetermined low-level the sealing element is seated about the periphery of the plunger base opening and cuts off the external flow of oil through the opening. The rapid flow between the sealing element and the air line creates a pressure differential which, due to the flexibility of the sealing element, causes the sealing element to be squeezed toward the air line and thus seal around both the periphery of the opening and the air line to completely stop flow through the opening.

In an advantageous form of this invention the valve is made of two elements; the upper element is of low density to facilitate the floating of the valve and the lower element is a resilient ring being annularly recessed at its bottom and thereby having an internal shoulder. The disposition of the ring is such that its bottom is further from the air line and can thus move a greater distance when flexed to positively bring the shoulder into sealing contact with the air line when the pressure differential squeezes the ring. The upper element may be a substantially rigid cylinder which maintains the dimensional stability of the upper portion of the recessed ring and thus provides a hinging point for the shoulder.

Novel features and advantages of the present invention will become apparent to one skilled in the art from a reading of the following description in conjunction with the accompanying drawings wherein similar reference characters refer to similar parts and in which:

FIG. 1 is a cross-sectional view in elevation of one embodiment of this invention operating with a normal hydraulic liquid supply;

FIGS. 2 and 3 are cross-sectional views in elevation of the embodiment of the invention shown in FIG. 1 operating with a low hydraulic liquid supply;

Figure 4:
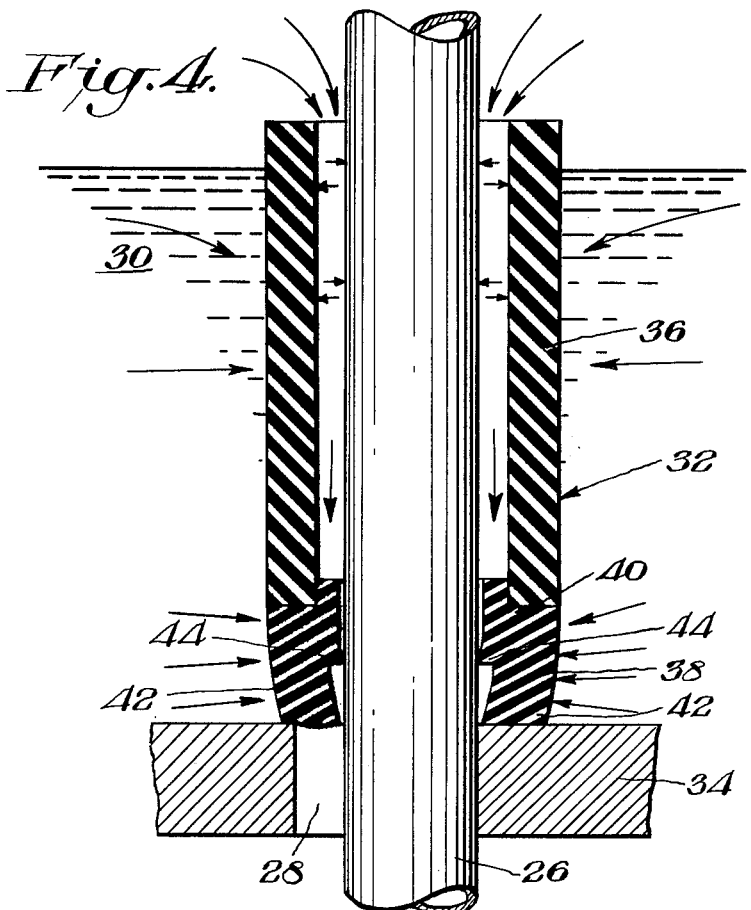
FIG. 4 is an enlarged cross-sectional view in elevation of an embodiment of the invention operating as shown in FIG. 3.

In FIGS. 1–3 is shown a semi-hydraulic lift 10. Cylinder 12 is embedded in a pit with its upper end at the level of the ground or garage floor 14. Plunger 16 reciprocates within cylinder 12 and carries an automobile-supporting structure or carriage 18. Cylinder 12 is closed at its upper end by a packing or other sealing means 20 and is closed at its lower end by base plate 22. Annular bearing 24 guides plunger 16 as it reciprocates in cylinder 12. Air supply line 26 extends through base plate 22 and into plunger 16 through oil outlet 28. The air from supply line 26 forces oil 30 through outlet 28 and into cyilnder 12 to raise plunger 16.

In FIG. 1 plunger 16 is shown in an intermediate upward position when there is sufficient oil in the plunger to make its full upward stroke. The float operated low-level control valve 32 is mounted about air supply line 26. In the condition shown in FIG. 1 valve 32 floats at the top of the oil level at all times and all the oil required for the full plunger stroke flows through oil outlet 28 into cylinder 12. Since more oil is provided than is required for a full stroke, several inches of oil 30 remain above this outlet when the plunger reaches its top limit and floating valve 32 also remains several inches away from outlet 28.

FIGS. 2 and 3 show lift 10 when there is insufficient oil for a full plunger stroke, as frequently happens when oil is lost through packing leaks, insufficient filling or other causes. In FIG. 2 the level of oil 30 in plunger 16 is approaching the annular space or oil outlet 28 between air line 26 and plunger base plate 34. Floating valve 32 is then also nearing the area of higher velocity of approach of the oil to outlet 28 and is eventually suddenly sucked down against base plate 34 and seals outlet 28 as later described in detail. FIG. 3 shows valve 32 in this final sealing position. When valve 32 assumes this position, the upward movement of plunger 16 is suddenly stopped and it can rise no further. FIG. 4 shows the operation of valve 32 when it seals oil outlet 28 and indicates the forces and conditions existing which hold valve 32 in this position to prevent passage of oil and air through the outlet. Because of its unique shape and construction, valve 32 is able to seal both against the outside diameter of air line 26 and around the annular clearance 28 in base plate 34 as later described in detail.

Figure 5:
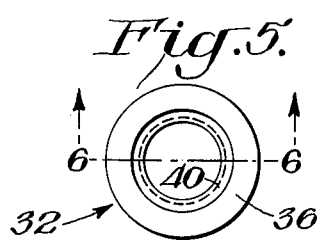
FIG. 5 is a top plan view of the low hydraulic liquid control valve shown in FIGS. 1–4.
Figure 6:
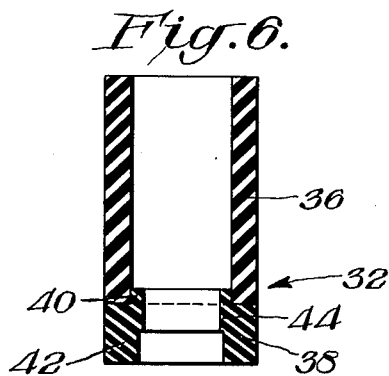
FIG. 6 is a cross-sectional view taken through FIG. 5 along the line 6—6.

As shown in FIGS. 5 and 6 floating valve 32 is ring shaped and comprises substantially rigid cylindrical buoyant body 36 having a density, for example, of approximately 0.4 to 0.5 and an annularly recessed ring 38. Buoyant body 36 is for example a closed cellular plastic such as polyurethane foam which is impervious to chemical action or crushing if immersed in hydraulic oil at, for example, 200 p.s.i. and is thus capable of withstanding oil or air under considerable pressure without deformation or absorption of oil. Buoyant 36 is, for example, three inches long with a 1 15/16-inch outer diameter and an inner diameter of 1¼ inches. Bonded to buoyant body 36 by, for example, an epoxy resin cement is tubular resilient sealing element 38 made of, for example, a synthetic rubber such as Buna-N having a 50–50 durometer number. The inside diameter of valve 32 is slightly larger than the outside diameter of air line 26 which is for example 7/8 inch so that in normal use there is clearance between valve 32 and air line 26 to facilitate the free floating of valve 32 at the surface of oil 30. As shown in FIG. 6 buoyant body 36 has a greater inside diameter than sealing element 38, and thus its dimensions are not as critical. Consequently, buoyant body 36 can be manufactured with greater tolerances than those required for sealing element 38. The inside diameter of the bottom or lower portion 42 is for example 1.06 plus or minus 0.005 inch while the inside diameter of upper portion 40 is for example 0.915 inch. Sealing element 38 extends below buoyant body 36, for example 13/16 inch, and lower portion 42 has, for example, a length of 13/32 inch. To insure adequate bonding sealing element 38 projects above the base of buoyant body 36 at its inner surface a distance of, for example 3/16 inch and has a radial thickness of, for example, 0.1675 inch. The diameter of oil outlet 28 is, for example, 1¼ inches, while the annular clearance between air line 26 and the periphery of oil outlet 28 is, for example, 3/8 inch. The radial thickness of lower portion 42 is, for example, 7/16 inch or at least as great as the annular clearance so that lower portion 42 is thick enough to completely seal outlet 28. The length of lower portion 42 is, for example, 13/32 inch or approximately one half the overall length of the entire sealing element 38 and approximately equal to the radial thickness of lower portion 42.

As shown in FIG. 4 when oil 30 is at a predetermined low level float 32 drops into contact with base plate 34 to cut off the external flow through outlet 28. The rapid flow between the inner surface of float 32 and air line 26 creates a pressure differential that progressively builds up which, due to the thinness and flexibility of sealing element 38, forces it into sealing contact with air line 26 as well as around the edge of oil outlet 28. The double seal is effected through the stepped or recessed inner surface or resilient sealing member 38. Although the hydrostatic pressure in plunger 16 is equal at all points and presses against float 32 in all directions including the annular clearance between float or valve 32 and air line 26, the inner surface of lower portion 42 is exposed to the downstream pressure or rapid flow in the clearance, which pressure is lower than that on its outer surface, and the net forces are thus inward toward air line 26 causing lower portion 42 to be squeezed toward air line 26. Since buoyant body 36 is rigid, it maintains the dimensional stability of upper portion 40 thus providing a hinging point for shoulder 44. Since lower portion 42 is thinner than upper portion 40 its flexing is facilitated and it moves a greater distance to bring shoulder 44 into sealing engagement with air line 28 while lower portion 42 seals around the periphery of outlet 28. If sealing element 38 were not recessed its lower portion might be frictionally held against base 34 of plunger 16 before it contacted air line 26 and thus would not reliably seal outlet 28. When the flow of fluid through the plunger outlet is cut off, the air line may be shifted to an eccentric position with respect to outlet 28, as shown in FIG. 4. Since lower portion 42 is at least as thick as the annular clearance between outlet 28 and air line 26, the above-described control valve 32 effectively functions in this eccentric condition as well as in the ideal condition where the air line is exactly concentric with the outlet.

When it is desired to lower plunger 16, hoist valves (not shown) are opened to exhaust the air inside plunger 16 above the oil. The air pressure in this area is reduced and reaches the point where the pressure is insufficient to support the load on plunger 16. Plunger 16 then descends causing oil to flow back through outlet 28 from cylinder 12 to dislodge floating valve 32 from its sealing position and permit it to float back to the upper level of the oil. If another attempt is made to raise plunger 16, the above-described sequence of operation is repeated.

What is claimed is:
1. A low level control valve for a semi-hydraulic lift having an air line and a hollow plunger with a bottom immersed in a liquid, an opening in said bottom, said air line extending upwardly within said plunger through said opening for introducing air pressure within said plunger above the level of said liquid, said valve comprising a substantially ring-shaped buoyant member loosely mounted about said air line, a resilient ring-shaped sealing element attached to the bottom of said buoyant member, said ring-shaped sealing element being large enough in radial dimension to seal to the periphery of said opening, the inner dimensions of said sealing element being large enough to space it from said air line when said sealing element is unstressed whereby its freedom of movement up and down said air line is facilitated, said sealing element being sufficiently flexible to cause a higher pressure outside of it relative to that inside of it to force it into sealing contact against said air line whereby it prevents said liquid from passing through said opening when the liquid level in said plunger falls sufficiently to drop said sealing element into sealing contact with said opening in the bottom of said plunger in response to air pressure introduced within said plunger above said level of said liquid through said air line, the top portion of said sealing element whereby it is attached to said buoyant member having an inner diameter less than the inner diameter of its bottom portion thereby disposing said top portion adjacent said air line for making sealing contact with it and maintaining said bottom portion clear of said air line, and an inner shoulder disposed between said top and said bottom portions which is forced into said sealing contact with said air line when said bottom portion of said sealing element drops into contact with said bottom of said plunger.

2. A valve as set forth in claim 1 wherein said ring-shaped sealing element has substantially cylindrical inner walls.

3. A valve as set forth in claim 2 wherein said ring-shaped sealing element has substantially cylindrical outer walls.

4. A valve as set forth in claim 2 wherein said lower portion is substantially thinner in radial dimension than said upper portion whereby the forcing of said shoulder into sealing contact with said air line is facilitated.

5. A valve as set forth in claim 4 wherein the radial thickness of said lower portion of said sealing element is at least as great as the clearance between said air line and said periphery of said opening.

6. A valve as set forth in claim 5 wherein the length of said lower portion is approximately equal to said radial thickness and approximately one-half the overall length of said sealing element.

7. A valve as set forth in claim 4 wherein a central portion of said sealing element is extended upwardly within the inner surface of said buoyant member to facilitate the bonding of said sealing element to said upper part.

8. A valve as set forth in claim 2 wherein said buoyant member is a substantially rigid cylinder whereby the dimensional stability of said upper portion of said sealing element is maintained to provide a hinging point for said shoulder when said shoulder moves into the sealing contact with said air line.

9. A valve as set forth in claim 8 wherein said sealing element is made of a synthetic rubber having a durometer number of approximately 50 to 55.

10. A valve as set forth in claim 9 wherein said buoyant member is a foamed plastic having a density of approximately 0.4 to 0.5 and is impervious to crushing at a pressure of 200 p.s.i.

References Cited by the Examiner
UNITED STATES PATENTS 3,140,641    7/1964    Clarke _____ 91—4

SAMUEL LEVINE, *Primary Examiner.*

FRED E. ENGELTHALER, MARK NEWMAN,
*Examiners.*